United States Patent [19] … [11] Patent Number: 5,457,796
Thompson … [45] Date of Patent: Oct. 10, 1995

[54] FILE SYSTEM WITH COMPONENTS SHARED BETWEEN SEPARATELY ADDRESSABLE VERSIONS

[75] Inventor: Kenneth L. Thompson, Watchung, N.J.

[73] Assignee: AT&T IPM Corp., Coral Gables, Fla.

[21] Appl. No.: 259,262

[22] Filed: Jun. 10, 1994

Related U.S. Application Data

[63] Continuation of Ser. No. 551,218, Jul. 11, 1990, abandoned.

[51] Int. Cl.$^6$ .................................................. G06F 17/30
[52] U.S. Cl. .................... 395/600; 395/180; 364/DIG. 1; 364/222.81; 364/243.4; 364/246
[58] Field of Search ...................................... 395/600, 575

[56] References Cited

U.S. PATENT DOCUMENTS

| | | | |
|---|---|---|---|
| 4,934,823 | 6/1990 | Okami | 364/200 |
| 4,947,367 | 8/1990 | Chang et al. | 364/900 |
| 5,040,110 | 8/1991 | Miki et al. | 364/200 |
| 5,043,871 | 8/1991 | Nishigaki et al. | 364/200 |
| 5,214,781 | 5/1993 | Miki et al. | 395/600 |
| 5,276,867 | 1/1994 | Kenley et al. | 395/600 |

OTHER PUBLICATIONS

Hume, A. "The File Motel–An Incremental Backup System for UNIX", 1988 Summer USENIX Conference Proceedings, pp. 61–72
Gait, J, "The Optical File Cabinet: A Random–Access File System A Random–Access File System for Write–Once Optical Disks", IEEE Computer, Jun. 1988, pp. 11–22.
Laskodi, T., Eifrig, B., Gait, J., "A UNIX File System for a Write–Once Optical Disk", 1988 Summer USENIX Conference Proceedings, pp. 51–60.
AT&T, ABARS Operation System Product Catalog, ABARS 3DFS Feature Description, Spring, 1989.
David L. Presotto, "Plan 9 from Bell Labs–The Network", Proceedings, Europe UNIX Users' Group, Spring 1988 Meeting.
Phillip M. Adams, Clovis L. Tondo, Writing DOS Device Drivers in C, Prentice Hall, Englewood Cliffs, N.J., 1990.
D. A. Canas, et al., "A File Management System for a Magnetic Disk Used as a Buffer to Write–Once Optical Storage", The Journal of Systems and Software, vol. 10, No. 1, Jul. 1989, pp. 15–21.
R. P. Olsen, et al., "Virtual Optical Disks Solve the On–Line Storage Crunch", Computer Design, vol. 28, No. 1, Jan. 1989, Tulsa, Okla., USA, pp. 93–96.
P. Rathmann, "Dynamic Data Structures on Optical Disks", International Conference on Data Engineering 1984, Silver Springs, USA, IEEE Computer Society Press 1984, pp. 175–180.
G. Diehr, et al., "Using Optical Storage Technology for Decision Support Databases", 7th International Conference on Decision Support Systems, Jun. 1987, San Francisco, USA, pp. 107–113.

(List continued on next page.)

*Primary Examiner*—Thomas G. Black
*Assistant Examiner*—Wayne Amsbury
*Attorney, Agent, or Firm*—Gordon E. Nelson

[57] ABSTRACT

A file system which has component file systems including a primary file system which is react/write and a number of dump file systems which are read only. Each dump file system is created from the primary file system by means of a dump operation and conserves the state of the primary file system at the time the dump operation was performed. Component file systems share read only storage elements with older component file systems. The file system is implemented on a system including a file server, a magnetic disk mass storage device, and an optical write once-read many (WORM) disk. The magnetic disk mass storage device contains the read/write storage elements of the primary file system and encached read only storage elements from the WORM disk. Space is reserved on the unwritten portion of the WORM disk for the read-write storage elements of the primary file system. Techniques for performing file operations including opening, reading, writing, creating, and deleting files are disclosed, as well as techniques for performing the operations of dumping and restoring the primary file system.

34 Claims, 5 Drawing Sheets

OTHER PUBLICATIONS

J. Gait, "The Optical File Cabinet: A Random–Access File System for Write–Once Optical Disks", IEEE Computer, Jun. 1988, USA, pp. 11–22.

Proceedings of the 33rd conference of Information Processing Society of Japan (1986), pp. 2001–2002 (Japanese–We are enclosing our Japanese agent's translation of the rejection based on the reference).

FILE SYSTEM WITH COMPONENTS SHARED BETWEEN SEPARATELY ADDRESSABLE VERSIONS

This application is a continuation of application Ser. No. 07/551,218, filed on Jul. 11, 1990, now abandoned.

BACKGROUND OF THE INVENTION

1. Field of the Invention

The present invention is related to data storage in digital computers generally and more specifically to data storage using write once-read many (WORM) devices.

2. Description of the Prior Art

In computer systems, data which has a lifetime longer than the period during which the program which is using the data is executing is generally stored in file systems. For as long as file systems have existed, making backup copies of the files has been a problem. Backup copies are necessary for many reasons:

Computer system hardware or software may fail, causing losses of files;

User errors may inadvertently destroy files;

Users or intruders into the system may maliciously destroy files;

Users may need to recover an earlier version of data stored in the files.

Since making backup copies takes time and does not further the work at hand, users often neglect to make backups as often as they should. If files are lost and there are no backups, or if the backups are too old, enormous and expensive difficulties can result.

In response to this problem, the art has developed various automated backup techniques. Recently, automated backup systems have emerged in which the copies of the backed up files are stored on write once-read many or WORM devices. As the name implies, data can be written once to a WORM device and the data stored thereon can be read many times. Modern WORM devices are optical devices which provide random access to enormous quantities of data. A description of an optical disk WORM device may be found in Gait, Jason, "The Optical File Cabinet: A Random-Access File System for Write-once Optical Disks", *IEEE Computer*, June, 1988, pp. 11–22

An example of a file backup system employing an optical disk can be found in

Hume, Andrew, "The File Motel—An Incremental Backup System for UNIX" 1988 *Summer Usenix Conference Proceedings*, June 20–24, 1988, pp. 61–72

A problem which the above file backup system shares with many others is that the backup copies of the files are not as accessible to users of a computer system as the files presently on the system. In some cases, the backup copies must be physically retrieved from an archive and loaded onto the computer system; in others, like the system described in the above publication, the files are physically available but must be specifically mounted on the file system before they are accessible. Further, special tools are often required to deal with the backup files.

Of course, if a file system is stored on media which cannot be erased, then the need for backups to protect against human mistakes or malice or equipment failures is eliminated. The art has thus developed file systems in which the data is stored on an optical WORM system. One such file system is described in the Gait article cited above. While such file systems are essentially indestructible, they are not without their problems. First, since the entire file system is stored on optical disk, many disk blocks are wasted on the storage of transient files, i.e., files which are created and deleted in the course of execution of a program. Second, optical WORM devices are still substantially slower than magnetic disk devices, and file system performance suffers accordingly. While the speed problem can be alleviated by encaching data which has been read from the optical WORM device so that there is no need to retrieve it from the WORM device for a following read, encachement cannot solve the problem of wasted disk blocks. Further, though Gait's WORM file system contains substantially all of the data that was ever in the file system, it includes no provision for making backups at times that are significant to the users of the system, and therefore does not provide a way of reconstituting a file system exactly as it was at such a significant time.

What is needed, and what is provided by the present invention, is a file system in which the user can select significant times to make backups and in which the backups made at these times are as available to the user as any other files.

SUMMARY OF THE INVENTION

In one aspect, the invention is a file system for use in a computer system which has read/write and read only storage elements for storing the contents of the files. The file system includes one or more first sets of files whose entire contents are stored in the read only storage elements and a second set of primary files whose contents include old contents which are part of the contents of files in the first sets of files and new contents which are stored in the read/write elements but not in the read only elements.

In another aspect of the invention, the file system's read/write storage elements are stored in a read/write device, the read only storage elements are stored in a WORM device, and read/write storage elements are written to the WORM device only during a dump operation.

These and other aspects, objects, and advantages of the invention will become clear to those skilled in the arts to which the invention pertains upon consideration of the following Detailed Description and Drawing, wherein:

Reference numbers in the figures have two parts: the two right-most digits are numbers within a drawing; the left digit is the number of the drawing in which the item indicated by the reference number first appears. Thus, the item identified by the reference number 117 first appears in FIG. 1.

DETAILED DESCRIPTION

The following Detailed Description of a preferred embodiment of the invention begins with a discussion of the logical structure of the file system of the invention, continues with a discussion of the operation of the file system of the invention, and concludes with a discussion of an implementation of the file system which employs an optical write once-read many optical disk device and a magnetic disk device.

Figure 1:
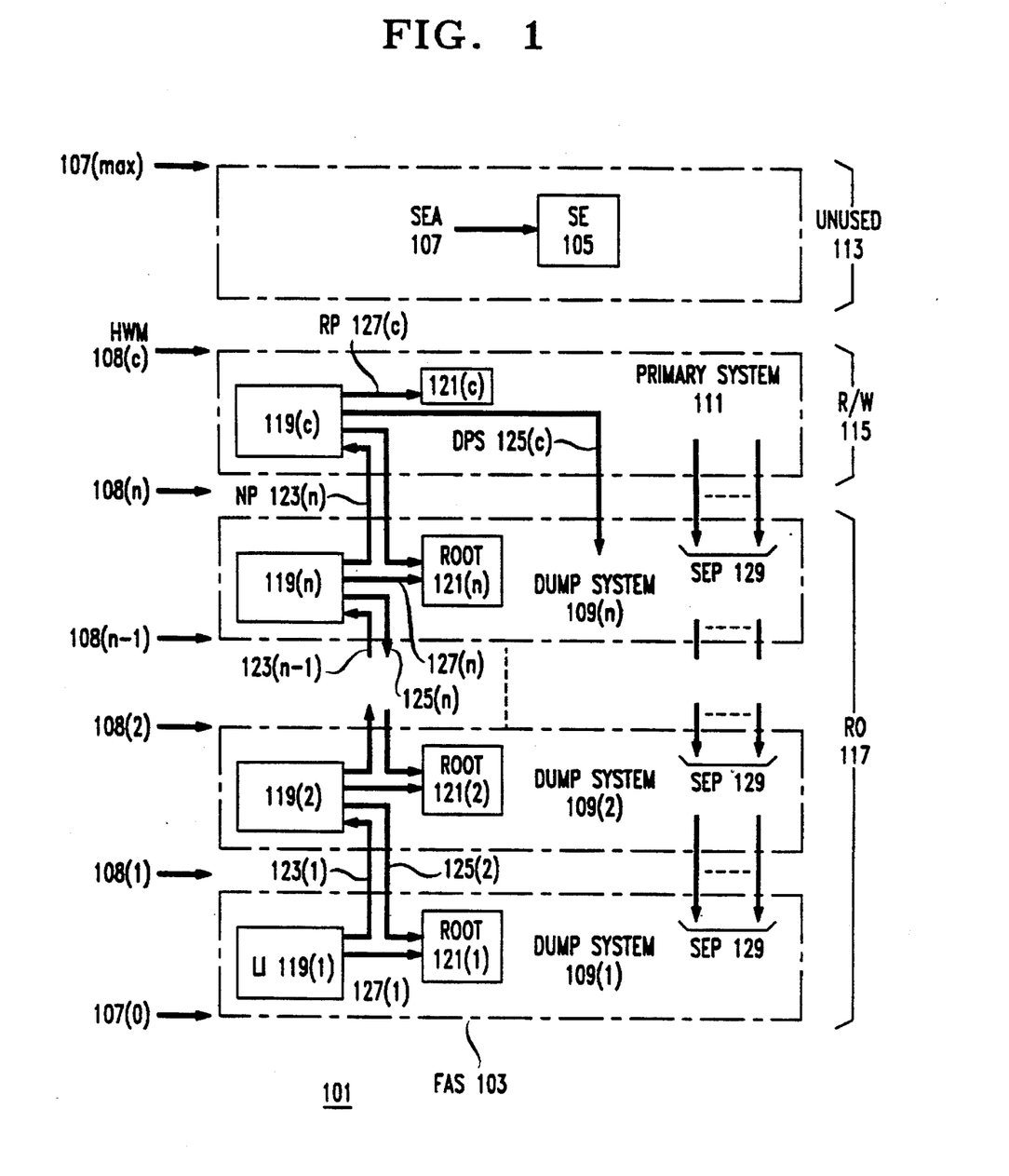
FIG. 1 is an overview of the file system of the invention.
Figure 2:
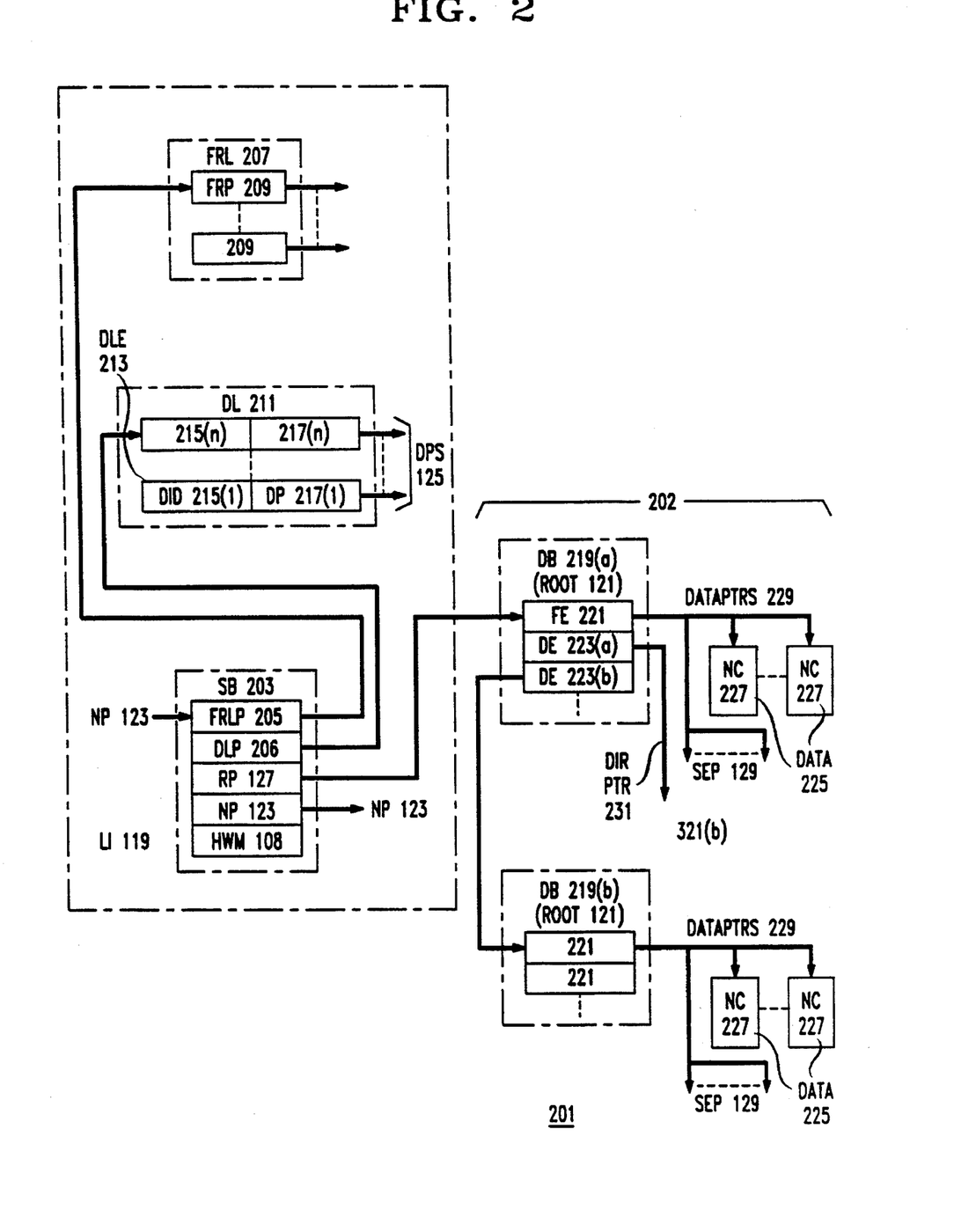
FIG. 2 is a diagram of a component file system of the invention.

Logical Structure of the File System: FIGS. 1 and 2

This discussion of the logical structure of the file system first provides an overview of the entire file system of the invention and then provides an overview of a component file system in the invention.

Overview of the File System: FIG. 1

FIG. 1 is a conceptual overview of file system 101 of the invention. All information contained in file system 101 is stored in storage elements (SE) 105. Each storage element 105 has a storage element address (SEA) 107 and is randomly accessible by storage element address 107. SE 105 may be implemented as a block on a randomly accessible device such as a magnetic or optical disk drive or a memory. The total number of possible storage element addresses 107, ranging from storage element address 107(0) through storage element address 107(max) makes up file address space (FAS) 103. The size of file address space 103 is, in principle, limited only by the size of storage element addresses 107; however, in some embodiments, its size may be determined by the size of the physical devices upon which storage elements 105 are stored.

Each storage element 105 belongs to one of three address spaces: read only address space 117, read/write address space 115, or unused address space 113. Storage elements 105 belonging to read-only address space 117 are inalterable components of file system 101; they may be read but neither written nor removed from file system 101. Storage elements 105 belonging to read-write address space 115 are alterable components of file system 101; they may be added to file system 101, written to, read from, and removed from file system 101. Storage element 105 belonging to unused address space 113, finally, are neither part of file system 101 nor presently available to be added to it.

At the beginning of operation of file system 101, all storage elements 105 belong to unused address space 113; when a storage element 105 is required for file system 101, file system 101 moves the storage element from unused address space 113 to read/write address space 115; when a storage element 105 has become an inalterable component of file system 101, file system 101 moves the storage element from read/write address space 115 to read-only address space 117. Once a storage element 105 is in read only address space 117, it remains there. Consequently, as file system 101 operates, the number of storage elements 105 in unused address space 113 decreases and the number in read only address space 117 increases. When there are no more storage elements 105 in unused address space 113, the user must copy the files he needs from file system 101 onto another file system. File address space 103 can, however, be made so large that it is for practical purposes inexhaustible.

For the sake of simplicity, FIG. 1 presents the address spaces as though they were separated by clear boundaries in file address space 103. That is true only for unused address space 113. A storage element address HWM 108(c) marks the "high water mark" in file address space 103, i.e., the address of the first storage element which belongs to neither read/write address space 115 nor read only address space 117. All storage elements having addresses of HWM 108(c) or greater belong to unused address space 113. However, any storage element 105 having an address less than HWM 108(c) may belong either to read/write address space 115 or read only address space 117.

File address space 103 contains two kinds of component file systems: primary file system 111 and some number of dump file systems 109. Primary file system 111 behaves like a standard file system. Accordingly, all of the usual file operations may be performed on files in primary file system 111. Existing files may be read from, written to, and deleted; new files may be created. Files in dump file systems 109, on the other hand, may only be read. As is apparent from these properties, primary file system 111 may have storage elements 105 belonging to read/write address space 115 or read only address space 117, while all storage elements 105 of a dump file system 109 belong to read only address space 117. The line which appears in FIG. 1 at the top of each dump file system 109 represents the value of HWM 108(c) at the time the dump file system 109 was created; the line is thus labeled with the number of dump file system 109. A number of dump file systems 109 may have the same value for HWM 108. Storage elements 105 belonging to a given component file system may be located anywhere in file address space 103 below HWM 108 for the file system, and a storage element 105 may be shared by more than one component file system.

A dump file system 109 is created by performing a dump operation on primary system 111. The dump operation has the logical effect of adding those storage elements 105 in read/write address space 115 which are part of primary file system 111 at the time of the dump operation to read only address space 117. The dump operation in file system 101 is atomic, i.e., no changes can be made in the files of primary system 111 during the dump operation. The dump operation accordingly conserves the state of primary file system 111 at the time the dump operation was performed. As a consequence of the manner in which the dump operation is performed, the dump file systems 109 are ordered in read only address space 117 by the time at which the dump operation which created the dump file system 109 was performed, with the dump file system 109 resulting from the earliest dump operation having the lowest HWM 108 in read only address space 117 and the dump file system 109 resulting from the most recent dump operation having the highest HWM 108. The dump file systems 109 thus represent an ordered set of "snapshots" of past states of primary system 111.

Each component file system is organized as a tree, i.e., the storage elements 105 for all of the files in the component file system are accessible from a root 121 in the component file system. As previously indicated, storage elements 105 in primary file system 111 may belong to either read/write address space 115 or read only address space 117. The storage elements 105 belonging to read/write address space 115 are those which have new contents, i.e., those which contain parts of primary file system 111 which have been altered since the last dump operation. The storage elements 105 belonging to read only address space 117 are those which have old contents, i.e., those storage elements 105 in which portions of the file system are stored which have not been altered since the last dump operation.

As is apparent from the foregoing and the manner in which a dump file system 109 is created, the storage elements 105 of primary file system 111 which had new contents when dump file system 109 was created belong to the addition to read only address space 117 which was made when the dump operation was performed and the storage elements 105 of primary file system 111 which had old contents when dump file system 109 was created belong to the read only address space 117 which existed prior to the dump operation and are shared with earlier component file systems. This fact is indicated in FIG. 1 by shared element pointers (SEP) 129 in each component file system. The storage elements 105 pointed to by these pointers are shared with at least one other older component file system. In the case of the primary file system 111, such storage elements 105 are ones whose contents have not been altered since the last dump operation; in the case of a given dump file system 109, the shared element pointers 129 point to storage elements 105 which were not altered between the dump operation which created the preceding dump file system 109 and the dump operation which created the given dump file system 109. As is further apparent, a given storage element 105 in read only address space 117 is part of every component file system from the dump file system 109 resulting from the first dump operation after the given storage element 105 was incorporated into primary system 111 to the dump file system 109 (if any) produced by the dump operation immediately preceding the time at which the contents of the given storage element 105 were modified in the course of file operations on primary file system 111.

Each root 121 is itself accessible from location information block 119 in each component file system by means of root pointer (RP) 127, which points to storage element 105 which contains root 121. Additionally, each location information block 119 contains dump pointers (DPS) 125 to roots 121 in each component file system which precedes the component file system to which location information block 119 belongs and a next pointer (NP) 123 to the location information block 119 in the component file system which succeeds the component file system to which location information block 119 belongs. Location information block 119 for the first dump system 109(1), finally, is at a predetermined address in file address space 103. Every file in file system 101 may thus be located either directly from location information block 119(c) in primary file system 111 or indirectly from location information block 119( 1 ). The chain of location information blocks beginning with location information block 119(1) is used to reconstruct location information block 119(c) in case of a failure of the physical device upon which read/write address space 115 is implemented. Location information block 119(c) serves in effect as a root for all of the files in file system 101, and it is consequently possible for a user of file system 101 to locate and read a file in a dump file system 109 in exactly the same way as the user would locate and read a file in primary file system 111. For example, from the user's point of view, comparing a version of a file in primary file system 111 with a version of the file in a dump file system 109 is no different from comparing two versions of the file in different directories of primary file system 111.

Detailed Structure of a Component File System:
FIG. 2

FIG. 2 is a diagram of the structure of a component file system in file system 101. All of the information which is contained in the files and which is needed to organize the files into a file system is stored in storage elements 105. All of the component file systems have similar structures; however, in dump file systems 109, all of the storage elements 105 in the file system belong to read only address space 117, while primary file system 111 has some storage elements 105 which belong to read only address space 117 and others which belong to read/write address space 115.

The files in the component file systems are hierarchical. Each file belongs to a directory and a directory may contain files or other directories. The hierarchy has the form of a tree with a single root node. The directories are internal nodes of the tree and the files are the leaf nodes. In a preferred embodiment, there is a single path through the tree from the root to each leaf node, i.e., no file or directory belongs to more than one directory.

As shown in FIG. 2, component file system 201 has two main parts: location information 119 and file tree 202. Beginning with file tree 202, tree 202 has two kinds of elements: directory blocks (DB) 219, which represent directories, and data blocks (DATA) 225, which contain the data for a file. Directory blocks 219 contain two kinds of entries: file entries (FE) 221, which represent files belonging to the directory, and directory entries (DE) 223, which represent directories belonging to the directory. There is one file entry 221 and one directory entry 223 for each file and directory belonging to the directory. A file entry 221 contains data pointers (DATA PTRS) 229 to the data blocks 225 which contain the file's data; a directory entry 223 contains a directory pointer (DIR PTR) 231 to directory block 219 for the directory represented by directory entry 223. As will be explained in more detail below, data blocks 225 and directory blocks 219 may be shared with other older component file systems; when that is the case, the data pointers 229 to those data blocks and the directory pointers 231 to those directories are shared element pointers 129.

Location information 119 has three components in a preferred embodiment: superblock (SB) 203, dump list (DL) 211, and free list (FRL) 207. Superblock 203 contains pointers by which the other parts of a component file system can be located, is pointed to by next pointer 123 belonging to the preceding component file system, and itself contains next pointer 123 to superblock 203 for the following component file system. In the case of superblock 203 for primary file system 111, the superblock contains HWM 108(c). These contents are arranged in superblock 203 as follows:

HWM 108 contains HWM 108(c) in primary file system 111 and the value of HWM 108(c) at the time the dump operation was performed in dump file systems 109.

NP 123 contains next pointer 123 in dump file systems 109;

RP 127 is the pointer to root 121 for the component file system;

DLP 27 is a pointer to dump list 211;

FRLP 205 is a pointer to free list 207.

Dump list 211 contains a list of all of the dump file systems 109 which precede the component file system to which dump list 211 belongs. Each entry (DLE) 213 in dump list 211 has two parts: dump identifier 215 and dump pointer 217. Dump identifier 215 is a unique identifier which identifies the dump file system 109 represented by dump list entry 213; in a preferred embodiment, dump identifier 215 specifies the time and date at which the dump operation which created dump file system 109 was carded out. Dump pointer 217 is a pointer to root 121 for the dump file system 109 represented by dump list entry 213. Taken together, the dump pointers in dump list 211 thus make up dump pointers (DPS) 125.

Free list 207, finally, is a list of addresses 107 of storage elements 105 which are no longer part of unused address space 113 but are not presently part of primary file system 111. For example, if a new file is created in primary file system 111 after the last dump operation and then deleted before the next dump operation, the addresses 107 of the storage elements 105 from the deleted file are placed on free list 207. Free list 207 is an important advantage of file system 101, since it permits the set of storage elements 105 belonging to read/write address space 115 to fluctuate between dump operations without a corresponding fluctuation of unused address space 113.

Though free list 207 is part of every component file system, it has significance only in primary file system 111, where it is the source of storage elements 105 to be added to primary file system 111, and the most recent dump file system 109, where it is used to reconstitute primary file system 111's free list 207 after a destruction of primary file system 111. When free list 207 in primary file system 111 becomes empty as a result of incorporation of free storage elements 105 into primary file system 111, file system 101 obtains a new storage element 105 from unused address space 113 by adding the current value of HWM 108(c) to free list 207 and incrementing HWM 108 in superblock 203.

As previously mentioned, the storage elements 105 making up primary file system 111 belong to either read-write address space 115 or read only address space 117. In more detail, the storage elements 105 containing the components of location information 119 and root 121 always belong to read/write address space 115, as do the storage elements 105 on free list 207. The parts of tree 202 are in read/write address space 115 as follows:

Any directory block 219 which is part of a path to a file which is presently open for an operation which alters the file is contained in a storage element 105 in read/write address space 115;

Any data block 225 which has been written to since the last dump operation is contained in a storage element 105 in read/write address space 115.

The technique by which storage elements 105 containing new contents replace those with shared contents will be explained in detail below.

Figure 3:
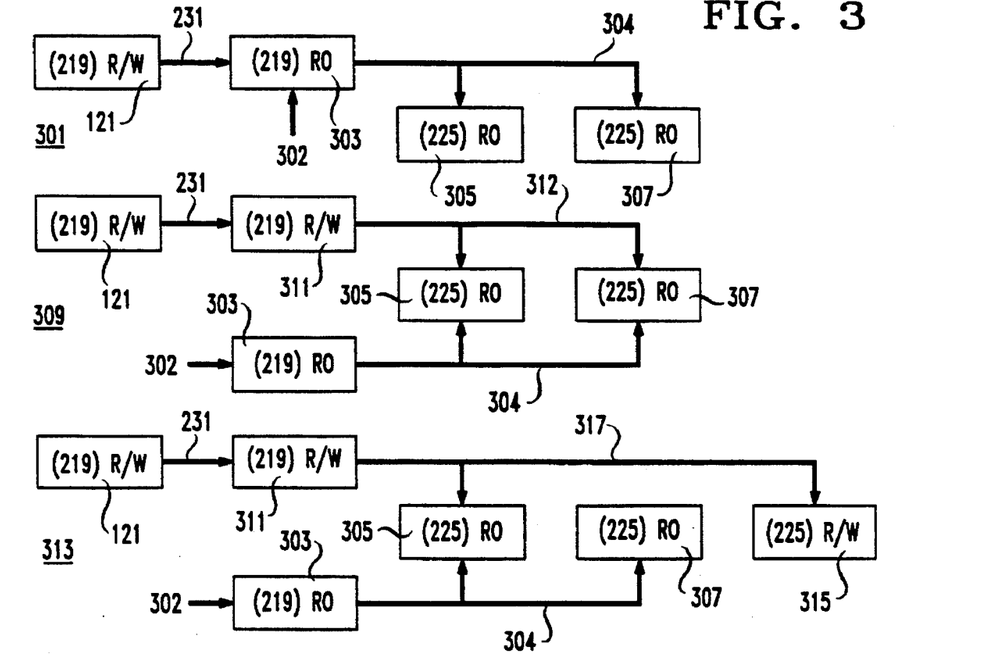
FIG. 3 is a diagram of an operation which alters a primary file system in the file system of the present invention.

Performing Operations on Component File Systems: FIG. 3

Operations on file systems can be divided into two classes: those which alter the file system and those which do not. Operations of the second class, termed hereinafter read operations, can be performed in the usual manner on any component file system of file system 101. Operations of the first class, termed hereinafter write operations, may be performed only on files and directories in primary file system 111. FIG. 3 shows how two of the write operations, file open and file write, are performed in a simple example primary file system 111 which contains exactly one file. Each block in FIG. 3 contains a number in parenthesis indicating the type of component represented by the block and an indication of the address space to which the storage element 105 containing the component belongs. Thus, root 121 is a directory block 219 and belongs to read/write address space 115.

The portion of FIG. 3 labeled 301 shows the example primary file system 111 at a time after the last dump operation but before the single file has been opened. Only root 121 belongs to read/write address space 115; the remaining components, including directory 303 to which the file belongs and the data blocks 305 and 307 for the file belong to read only address space 117, i.e., directory 303 and data blocks 305 and 307 are shared at least with dump file system 109 made by the last dump operation, as indicated by pointer 302 from root 121 for the immediately preceding dump file system 109.

The next portion, labeled 309, shows the example primary file system 111 at a time after the single file has been opened for writing but before any file write operation has occurred. Because the file has been opened, it must have a directory block 219 in read/write address space 115. This directory block 219, which has the number 311 in the FIG., is made by taking a storage element 105 from free list 207, copying the contents of directory block 303 into directory block 311, and changing pointer 231 in root 121 to point to directory block 311 instead of directory block 303. Data blocks 305 and 307 are now pointed to by both directory block 303 and directory block 311, as indicated by 312 and 304, representing data pointers 229 pointing to the data blocks.

The final portion, labeled 313, shows the example primary file system 111 after a file write operation which has altered data originally contained in data block 307. The altered data requires a new data block, block 315, which belongs to the read/write address space 115. Block 315 is taken from free list 207 as before and the data pointers 229 in directory block 311 are reset so that block 315 takes the place of block 307. Then the altered data is written to block 315. At the end of the operation, file entry 221 for the file in directory 311 points to blocks 305 and 315, as indicated by pointer 317, while file entry 221 for the file in directory 303 still points to blocks 305 and 307 as indicated by pointer 304. Thus, the original file is retained in dump file system 109 and the altered file in primary system 111.

Other standard file operations are performed analogously. For example, when a file is created, a new file entry 221 for the file is made in a directory block 219; if the directory block 219 already belongs to read/write address space 115, the new file entry is simply added to the directory block 219; otherwise a new directory block 219 is made as described above for the open operation and the new file entry 221 is added to the new directory block. In the case of a file delete operation, only those data blocks of the file to be deleted which belong to read/write address space 115 can be deleted; this is done by returning the addresses of storage elements 105 containing the deleted data blocks 225 to free list 207. At the same time, the file entry 221 in the directory block 219 for the directory to which the file belongs is also deleted. If all of the file entries 221 and directory entries 223 in a directory block 219 are deleted, that block's storage element 105, too, is returned to free list 207. As shown by the delete example, a particular advantage of file system 101 is that changes in primary file system 111 which affect primary file system 111 for a period which is less than the period between dump operations take place in read/write address space 115 and do not add storage elements 105 to read only address space 117.

Figure 4:
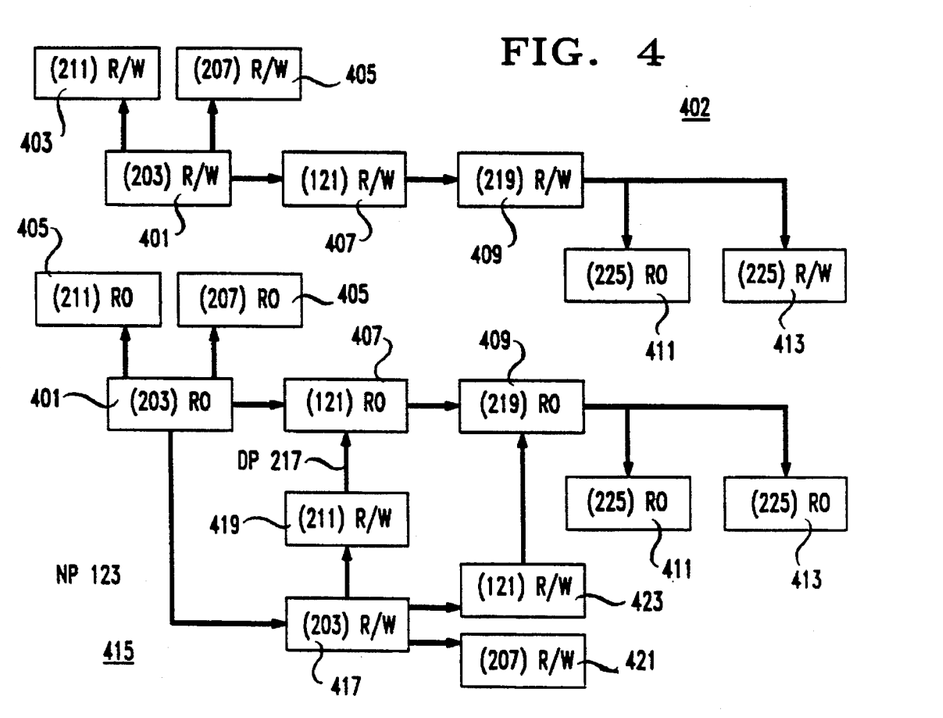
FIGS. 4A and 4B are diagrams of a dump operation in the file system of the present invention.

The Dump Operation: FIGS. 4A and 4B

In broad terms, the dump operation creates a dump file system 109 by moving storage elements 105 in primary file system 111 which belong to read/write address space 115 from read/write address space 115 to read only address space 117 and reestablishing the parts of primary file system 111 which must be presently alterable in read/write address space 115. In a preferred embodiment, the algorithm for performing the dump operation is the following:

1. Set next pointer 123 in superblock 203 for primary file system 111 to HWM 108;

2. Add all storage elements 105 for primary file system 111 which belong to read/write address space 115 and which are not on free list 207 to read only address space 117;

3. Reestablish primary file system 111 in read/write address space 115 by doing the following:

a. Copy the contents of superblock 203 to storage element 105 having HWM 108 as its storage element address 107 to make a new superblock 203 for the primary file system 111 and increment HWM 108 in the new superblock 203 to point to the next storage element 105;

b. Taking storage elements 105 from free list 207, copy location information 119 and root 121 to the storage elements 105;

c. Update the pointers in the new superblock 203 to point to the location information 119 and root 121 in the storage elements 105 taken from free list 207;

d. Add an entry for the new dump file system 109 to dump list 211; and e. For every file in primary file system 111 which is open at the time of the dump operation, walk tree 202 from root 121 in new read/write address space 115 to directory block 219 which contains file entry 221 for the file; for each directory block 219 encountered in the walk which is not yet in new read/write address space 115, copy the directory block 219 to a storage element 105 taken from free list 207 and alter directory entry 223 and any copies of information from directory entry 223 in the computer system to which file system 101 belongs to point to the new copy.

The algorithm is performed atomically, i.e., no changes to file system 101 other than those required for the algorithm are permitted during execution of the algorithm.

In an alternative embodiment, the contents of superblock 203 may be copied to a new superblock 203 taken from free list 207, next pointer 123 updated to point to the new superblock 203, and then all storage elements 105 in read/write address space 115 other than the new superblock 203 added to read only address space 117.

FIGS. 4A and 4B show how the dump operation works in a primary file system 111 which contains exactly one directory in which there is exactly one closed file. Again, each box in the figure contains a reference number indicating what kind of component of primary file system 111 the box represents and an indication of which of the address spaces 115 and 117 the component belongs to. FIG. 4A shows primary file system 402 as it exists at the time of the dump: Components 401, 403, and 405, making up location information 119, root 407 and directory block 409 all belong to read/write address space 115; the file has one data block 411 which has not been altered since the last dump operation, and consequently belongs to read only address space 117; the other data block 413 has been altered, and so belongs to read/write address space 115.

FIG. 4B shows primary file system 415 as it exists after completion of the dump: components 401–409 and 413 have all been moved to read-only address space 117, copies 417–423 in read/write address space 115 have been made of components 401–407, pointers in the copies of location information 119 have been set so that root pointer 127 points to new root 423 and dump pointer 217 points to old root 407, and next pointer 123 in old super block 401 has been set to point to new superblock 417. If the file had been open, there would additionally have been a copy of directory block 409, and new root 423 would point to the copy.

Replacing Primary System 111 With a Dump File System 109

An advantage of file system 101 is that primary file system 111 may be easily replaced by any of the dump file systems 109. Replacement is done by performing the following steps, again atomically:

1. Except for those which contain location information 119, return the addresses of all storage elements 105 in primary file system 111 which belong to read/write space 115 to free list 207;

2. Using dump pointer 217 for the dump file system 109 which is replacing primary file system 111, locate root 121 for the dump file system 109 and copy root 121 into a storage element 105 from free list 207;

3. Replace root pointer 127 in superblock (SB) 203 with a pointer to the copy of root 121 for the dump file system 109.

If a failure in the computer system to which the file system belongs has resulted in the loss of location information 119, the location information 119 may be copied from location information 119 in the most recent dump file 109. In this case, if the dump file system 109 which is replacing primary file system 111 is the most recent dump file system 109, then the second step above is omitted.

Figure 5:
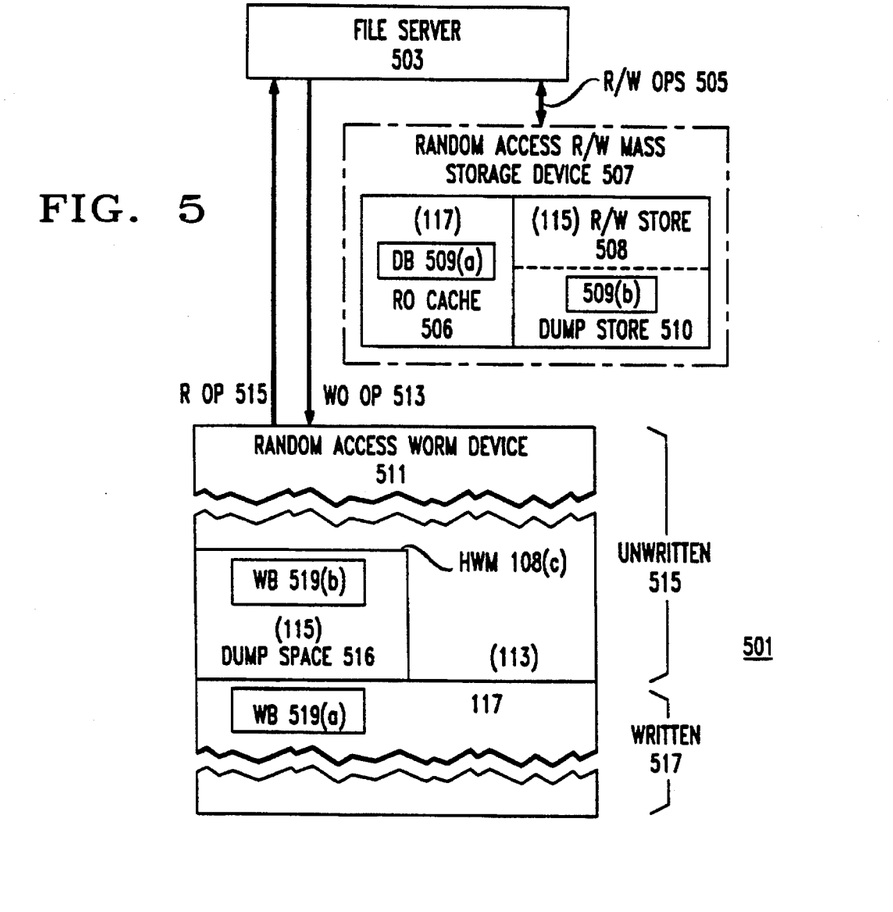
FIG. 5 is an overview of a preferred implementation of the present invention.
Figure 6:
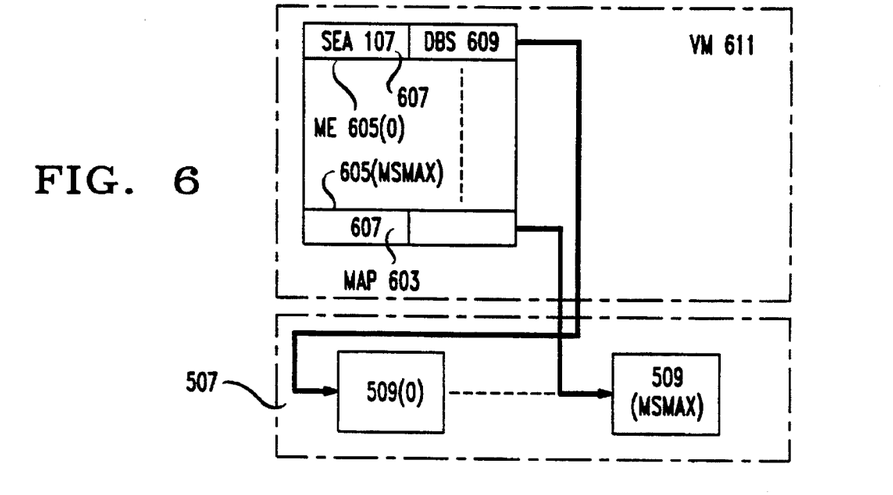
FIG. 6 is an overview of a preferred implementation of the subdivision of mass storage device 507.
Figure 7:
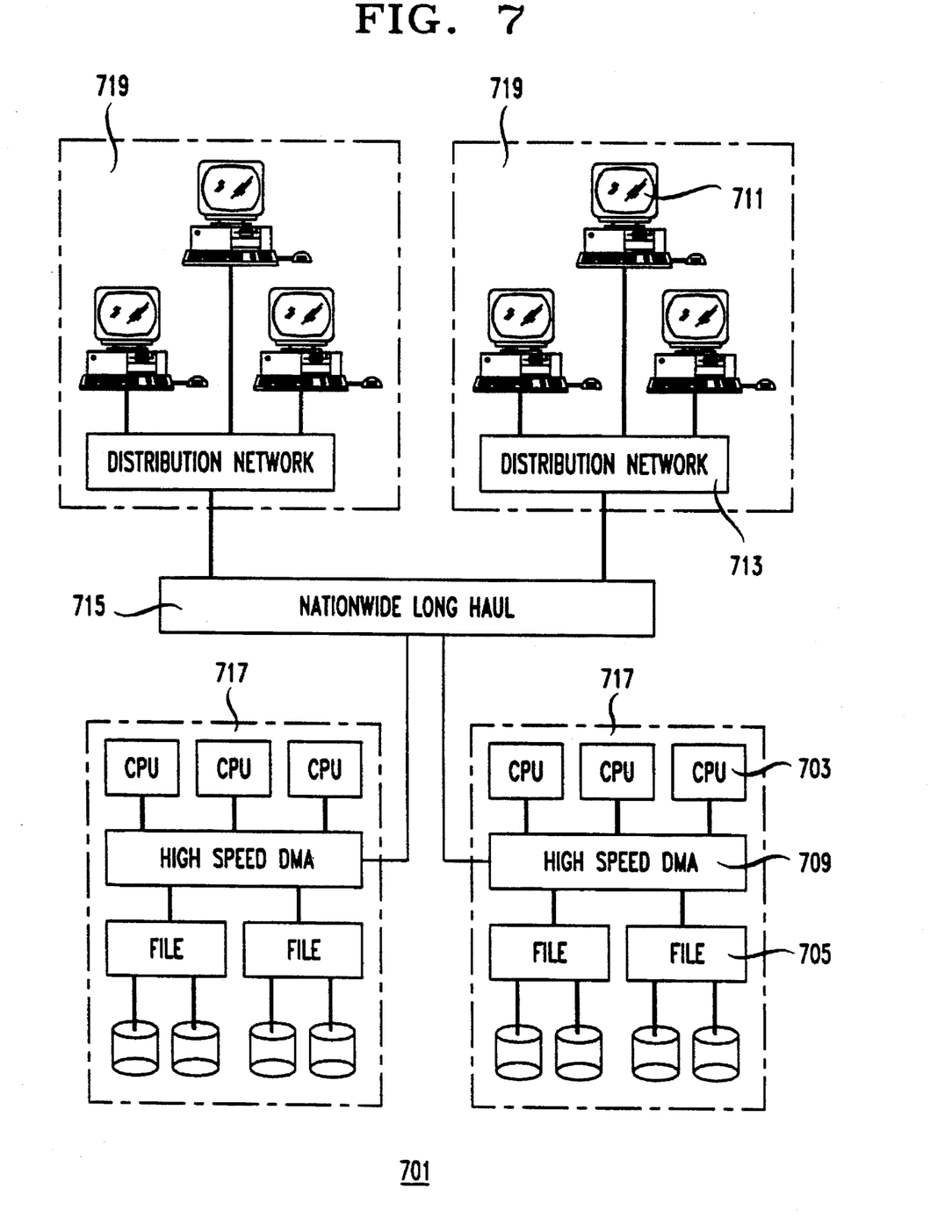

Implementation of File System 101 on a Read/Write Mass Storage Device and a WORM Storage Device: FIGS. 5 and 6

In a preferred embodiment, file system 101 is implemented using a read-write mass storage device and a WORM storage device. In the following, there will first be presented an overview of the implementation and the relationship of its components to file address space 103; then details of the organization of the read/write mass storage device will be presented, followed by details concerning the operation of the preferred embodiment.

Overview of the Implementation: FIG. 5

FIG. 5 is a high-level block diagram of a preferred implementation of file system 101. Implementation 501 has three main components: file server 503, random access read/write mass storage device 507, and random access write once-read many (WORM) device 511. File server 503 is a computer system which is employed in a distributed system to perform file operations for other components of the distributed system. In the preferred implementation, file server 503 is a VAX 750, manufactured by Digital Equipment Corporation. The file operations which it performs for other components are substantially the same as those defined for the well-known UNIX® operating system. File server 503 controls operation of the other components of implementation 501. Mass storage device 507 in a preferred embodiment is 120 megabytes of storage on a magnetic disk drive. WORM device 511 is the WDD-2000, a 1.5 gigabyte write-once optical disk manufactured by Sony, Inc.

The storage in both mass storage device 507 and WORM device 511 is divided into blocks of the same size. These blocks make up the storage elements 105 of the implementation. The blocks in mass storage device 507 appear in FIG. 6 as disk blocks (DB) 509 and those in WORM device 511 appear as WORM blocks (WB) 519. As will be explained in more detail later, disk blocks 509 correspond to certain WORM blocks 519. Such correspondences are indicated by letter suffix. Thus, disk block 509(a) corresponds to WORM block 519(a). File server 503 may both read and write disk blocks 509 many times; it may read WORM blocks 519 many times, but write them only once. These facts are indicated in FIG. 5 by read/write operations arrow 505 connecting file server 503 and mass storage device 507 and the separate write once operation arrow 513 and read operation arrow 515 connecting file server 503 and WORM device 511. They are further indicated by the division of WORM device 511 into unwritten portion 515 containing WORM blocks 519 which have not yet been written and written portion 517, containing written WORM blocks 519. Since WORM device 511 is random access, written and unwritten blocks may be physically intermixed.

Before a dump operation, the relationship between disk blocks 509 and WORM blocks 519 and file address space 103 is the following:

Written WORM blocks 519 belong to read-only address space 117, as do corresponding disk blocks 509; such disk blocks 509 contain copies of the contents of the corresponding WORM blocks 519;

Disk blocks 509 which correspond to unwritten WORM blocks 519 belong to read/write address space 115, as do the corresponding unwritten WORM blocks 519, which are reserved to receive the contents of the corresponding disk blocks 509 after a dump operation is performed, as indicated by the label "dump space 516" in their portion of WORM device 511;

Unwritten WORM blocks 519 which have no corresponding disk blocks 509 belong to unused address space 113.

As implied by the above, disk blocks 509 which correspond to written WORM blocks 519 and those which correspond to unwritten WORM blocks 519 have fundamentally different functions in file system 101. That is shown in FIG. 5 by the division of mass storage device 507 into two parts: read only cache 506 and read/write store 508. Again, since mass storage device 507 is a random-access device, disk blocks 509 belonging to either subdivision may be located anywhere in mass storage device 507.

Disk blocks 509 corresponding to written WORM blocks 519 serve as a cache 506 of those blocks. Mass storage device 507 has a faster response time than WORM device 511, and consequently, when file server 503 reads a written WORM block 519 from WORM device 511, it places a copy of that WORM block 519 in a disk block 509 so that it is available there if it is needed again. As is generally the case with caches, cache 506 contains copies of only a relatively small number of the most recently read WORM blocks 519. While cache 506 substantially enhances performance, it is not necessary to an implementation of file system 101.

Disk blocks 509 corresponding to unwritten WORM blocks 519, on the other hand, are the actual storage elements 105 for read/write address space 115 and are therefore essential to operation of file system 101. There must be a disk block 509 in read/write store 508 for every storage element 105 which is a part of primary file system 111. Since dump space 516 is reserved to receive the contents of read/write address space 115 when a dump operation is performed, there must be a WORM block 519 in dump space 516 corresponding to every disk block 509 in read/write store 508. Additionally, there must be a WORM block 519 in dump space 516 corresponding to every storage element 105 on free list 207. The storage elements 105 on free list 207, however, need not have corresponding disk blocks 509 belonging to read/write store 508. Accordingly, when free list 207 becomes empty and a storage element 105 must be added to read/write address space 115, dump space 516 must be expanded by one unwritten WORM block 519. As indicated by the presence of HWM 108(c) at the end of dump space 516, that is done by incrementing HWM 108(c).

For a time after completion of a dump operation, mass storage device 507 contains a third subdivision: dump store 510. Dump store 510 contains disk blocks 509 which are storage elements 105 which have been added to read only address space 117 by the dump operation. A disk block 509 remains in dump store 510 until its contents have been copied into the corresponding WORM block 519 in dump space 516. Upon being written, the WORM block 519 becomes pan of read-only address space 117 and its corresponding disk block 509 becomes pan of read-only cache 506.

As will be explained in more detail later, the actual dump operation in a preferred implementation simply marks disk blocks 509 which contain pans of primary file system 111 which are in read/write address space 115 as belonging to dump store 510. As soon as this is done, normal file operations continue. These operations treat components of primary file system 111 which are stored in disk blocks 509 belonging to dump store 510 as part of read-only address space 117. While these operations are going on, a dump daemon which executes independently in file server 503 copies the contents of the disk blocks 509 to the corresponding WORM blocks 519 in dump space 516. Once a disk block 509 has been copied, it is marked as belonging to read-only cache 506.

It should be pointed out at this point that file address space 103 may be larger than the address space of WORM device 511. To begin with, unused address space 113 may extend beyond the top address in WORM device 511. Further, as long as all storage elements 105 belonging to the component file systems being operated on by file system 101 are on WORM device 511, read-only address space 117 can extend below the lowest address in WORM device 511.

Implementation of the Subdivisions of Mass Storage Device 507: FIG. 6

In a preferred implementation, correspondences between disk blocks 509 and WORM blocks 519 and division of mass storage device 507 into read only cache 506, read/write store 508, and dump store 510 are established by means of a mass storage map 603, shown in FIG. 6. In the preferred implementation, mass storage map 603 is a data structure in virtual memory 611 of file server 503. Since mass storage map 603 is used in every file operation performed by file system 101, it is generally present in the main memory of file server 503 and therefore rapidly accessible to file server 503.

Map 603 is an array of map entries 605. There is a map entry 605 for each disk block 509 which is part of mass storage device 507, and the address of the disk block 509 represented by a given map entry 605 may be calculated from the index of the given map entry 605 in the array, as is indicated by the arrows connecting the first and last map entries 605 in map 603 to the first and last disk blocks 509 in mass storage device 507.

Moreover, the number of WORM blocks 519 in WORM device 511 is an integer multiple m of the number b of disk blocks 509 and map entries 605. Consequently, the index (I) of a map entry 605 may be computed from a WORM block address (WBA) by the operation $WBA\ MOD\ m$, and the disk block 509 represented by a given map entry 605 may correspond to any WORM block 519 for which $I = WBA\ MOD\ m$, where I is the index of the given map entry 605.

Each map entry 605 contains two fields. The first, storage element address field 607, contains storage element address 107 representing WORM block 519 corresponding to disk block 509 represented by map entry 605. In a preferred implementation, storage element address 107 is simply a WORM block address. The second field, disk block state 609, indicates the present state of disk block 509 represented by map entry 605. There are four states:

Not bound: There is no WORM block 519 corresponding to disk block 509;

Read only: Disk block 509 corresponds to the WORM block 519 specified by field 607. The WORM block is a storage element 105 belonging to read only address space 117, disk block 509 contains a copy of WORM block 519's contents, and disk block 509 belongs to read only cache 506.

Read/write: Disk block 509 corresponds to the WORM block 519 specified by field 607. The WORM block 519 belongs to dump space 516, disk block 509 is a storage element 105 of primary file system 111 which is in read/write address space 115, and disk block 509 belongs to read/write store 508.

Dump: Disk block 509 corresponds to the WORM block 519 specified by field 607. The WORM block 519 belongs to dump space 516, disk block 509 represents a storage element 105 in read only address space 117, and disk block 509 belongs to dump store 510.

Implementation 501 operates as follows: when a file read operation is performed, file server 503 uses the storage element address 107 of the storage element 105 to be read to locate a map entry 605. That address is termed herein address "A". What then happens depends on whether there is a disk block 509 corresponding to WORM block 519 addressed by A in mass storage device 507. If there is, field 607 in map entry 605 located by address A will contain address A. If it does and the map entry 605 is in the read only, read/write, or dump states, disk block 509 represented by map entry 605 contains the desired data and file server 503 reads the contents of disk block 509.

If there is not a disk block 509 corresponding to WORM block 519 in mass storage device 507 but the map entry 605 indicates that the disk block 509 it represents has the read only state, file server 503 copies the contents of WORM block 519 specified by address A into disk block 509 corresponding to map entry 605 and writes address A into field 607. If map entry 605 indicates the read/write or dump state, file server 503 cannot overwrite the contents of disk block 509 corresponding to map entry 605 and simply fetches the data from WORM block 519. If map entry 605 indicates the not bound state, finally, file server 503 fetches the data from WORM block 519, copies it into disk block 509 corresponding to map entry 605, writes address A into field 607, and sets DBS 609 to indicate the read only state.

When an operation which alters a file is performed, file server 503 again uses storage element address 107 A to locate a map entry 605. If field 607 in map entry 605 contains A and indicates the read only or dump states, file server 503 takes a storage element address 107 B from free list 207 and uses address B to locate a second map entry 605. If this map entry 605 is in the not bound or read only states, file server 503 copies the contents of the disk block 509 represented by the map entry 605 addressed by A to the disk block 509 represented by the map entry 605 addressed by B, sets field 607 in that map entry 605 to address B, and field 609 to indicate the read/write state. Pointers are updated in the file structure as already described and alterations are made to the disk block 509 represented by map entry 605 addressed by B. If the second map entry 605 is in the dump or read/write states, file server 503 takes another address from free list 207 and tries again. If map entry 605 indicates the read/write state, file server 503 writes to the disk block 509 represented by the map entry 605.

If address A is different from the address in field 607, then if map entry 605 indicates the read only state, file server 503 copies the WORM block 519 addressed by A into the disk block 509 represented by entry 605, sets the fields of map entry 605 accordingly, and proceeds as described above for map entries 605 in the read only state. If map entry 605 indicates the read/write state or dump state, file server 503 immediately copies the contents of disk block 509 represented by map entry 605 to the corresponding WORM block 519, which places disk block 509 in the read only state, and then proceeds as just described for map entries 605 indicating the read only state.

When file server 503 deletes a file, it locates map entry 605 for each disk block 509 which is a data block 225 in the file. If there is no entry, or if the map entry 605 indicates the read only or dump states, the file server 503 does nothing; if the map entry 605 indicates the read/write state, the file server 503 adds the storage element address 107 of the corresponding WORM block 519 to free list 207 and places the map entry 605 for the disk block 509 into the not bound state.

To begin a dump operation, file server 503 goes through map 603 and places all map entries 605 which are in the read/write state in the dump state. It then reestablishes primary file system 111 as previously described using the file operations just described. At this point, the dump operation is finished. In a preferred embodiment, the operation takes about 10 seconds. During that time, file system 101 is unavailable for use. While file server 503 continues normal file operations, a dump daemon process operating in file server 503 writes the contents of all disk blocks 509 represented by map entries 605 indicating the dump state to their corresponding WORM blocks 519. When the write of a disk block 509 is completed, DBS field 609 is set to indicate the read only state.

In an alternative embodiment, them may be an additional state, "old superblock" for disk blocks 509. In such an embodiment, when a dump operation begins, the disk block 509 containing superblock 203 for primary file system 111 is placed in the "old superblock" state until the address of disk block 509 for the new superblock 203 has been taken from free list 207 and copied into superblock 203. At that point, disk block 509 containing superblock 203 is placed in the dump state.

Conclusion

The foregoing Detailed Description has disclosed to one of ordinary skill in the arts to which the invention pertains how file system 101 of the invention may be implemented and has further disclosed a novel distributed data processing system in which the invention is advantageously employed. Moreover, while a preferred embodiment of file system 101 is implemented using a magnetic disk drive and a WORM optical disk drive, file system 101 may be implemented using any devices which provide random-access read many-write many storage and random-access write once-read many storage. Further, devices employing the principles of the invention may be implemented using alogorithms for file operations and the dump operation which differ from those disclosed herein.

For these reasons, the Detailed Description is to be considered in all respects as illustrative and exemplary, but not restrictive, and the scope of the inventions is to be determined not from the Detailed Description, but rather from the claims as read in light of the Detailed Description and interpreted according to the doctrine of equivalents.

What is claimed is:

1. A file system for use in a computer system, the file system comprising:

one or more first sets of secondary files accessible to users of the computer system through the file system and a second set of primary files whose contents include at least old contents which are part of the contents of the secondary files and which are stored for both the primary files and the secondary files in storage elements shared by the primary files and the secondary files and whose contents may also include new contents which are not part of the contents of secondary files and which are stored in unshared storage elements, the second set of primary files also being accessible to users of the computer system through the file system.

2. The file system set forth in claim 1 wherein:

each set of secondary files conserves the state of the set of primary files at a given past time.

3. The file system set forth in claim 1 or claim 2 wherein:

the file system further includes file operation means for performing operations on the files; and the file operation means performs a set of file operations on the second set and a subset of the set of file operations on the first sets, the subset not including operations which alter the files in the first sets.

4. The file system set forth in claim 1 wherein:

the entire contents of the first sets are stored in write once/read many storage elements; and any new contents of the second set are stored in read/write storage elements.

5. The file system set forth in claim 4 wherein:

the file system further includes file operation means for performing operations on the files; and the file operations include a dump operation in which an additional set of files belonging to the first sets thereof is created by writing any new contents to the write-once/read many storage elements.

6. The file system set forth in claim 5 wherein:

any new contents are written to the write once/read many storage elements only as a consequence of the dump operation.

7. The file system set forth in claim 5 wherein:

the file system further comprises means for relating the read-write elements belonging to the set of primary files to a first set of unwritten ones of the write once/read many storage elements and the dump operation writes the read-write elements belonging to the set of primary files to their related write once/read many elements in the first set.

8. The file system set forth in claim 7 wherein:

the file system further comprises means for marking the read-write elements as having been dumped; and the dump operation comprises a first part in which the read-write elements are marked in the means for marking; and a second part in which the marked elements are written to their related write once/read many elements in the first set of unwritten ones of the write once/read many storage elements.

9. The file system set forth in claim 8 wherein:

certain contents of the first sets are additionally stored in read-write storage elements;

the file system further comprises means for indicating the read-write storage elements in which the certain contents are stored; and the first part of the dump operation further includes the step of indicating the marked elements in the means for indicating.

10. The file system set forth in claim 8 or claim 9 wherein:

the first part of the dump operation is atomic and the writing of the marked elements is interspersed with the performance of other file operations.

11. The file system set forth in claim 4 wherein:

the file system further comprises file operation means for performing operations on the files;

a first set of the write once/read many storage elements which are unwritten and which correspond to the read-write elements belonging to the set of primary files; and a second set of the write once/read many storage elements which are unwritten and which have been allocated to the set of primary files but which presently do not belong to the first set;

the file operations include first file operations which add new contents to the set of primary files and second file operations which delete new contents from the set of primary files;

the first file operations remove unwritten write once/read many storage elements from the second set and add the storage elements removed from the second set to the first set to correspond to the read-write storage elements containing the added new contents; and the second file operations remove unwritten write once/read many storage elements corresponding to the read-write elements containing the deleted new contents from the first set and add the storage elements removed from the first set to the second set.

12. The file system set forth in claim 11 wherein:

the file operations include a dump operation in which an additional set of files belonging to the first sets thereof is created by writing the new contents to the write-once/read many storage elements;

the file system further comprises a first set of the write once/read many storage elements which are unwritten and which correspond to the read-write elements belonging to the set of primary files; and the dump operation writes the read-write elements belonging to the set of primary files to their corresponding write once/read many elements in the first set.

13. The file system set forth in claim 12 wherein:

the file system further comprises means for marking the read-write elements as having been dumped; and the dump operation comprises a first pan in which the read-write elements are marked in the means for marking; and a second part in which the marked elements are written to their related write once/read many elements in the first set.

14. The file system set forth in claim 13 wherein:

the file system further comprises memory means for storing a table indicating whether a given one of the read-write elements is in one of a plurality of states including a first state indicating that the read-write element does not have a corresponding write once/read many element, a second state indicating that the read-write element does have a corresponding write once/read many element and that the read-write element contains new contents, and a third state indicating that the read-write element does have a corresponding write once/read many element and that the read-write element is marked for dump;

the primary file system includes a list of the write once/read many storage elements which belong to the second set; and the first file operations remove unwritten write once/read many storage elements from the second set and add them to the first set by establishing correspondences between read-write storage elements moved from the first state into the second state and read once/write many storage elements removed from the list;

the second file operations remove unwritten write once/read many storage elements from the second set and add them to the first set by disestablishing correspondences between read-write storage elements moved from the second state into the first state and read once/write many storage elements added to the list; and the first part of the dump operation moves the read-write storage elements from the second state into the third state and the second part of the dump operation copies the contents of read-write storage elements in the third state into their corresponding unwritten read once/write many storage blocks.

15. The file system of claim 14 wherein:

the file system further comprises a third set of the read-write storage elements, a read-write storage element in the third set corresponding to a write once/read many storage element containing old contents and storing a copy of the corresponding write once/read many element's old contents; the plurality of states further includes a fourth state indicating that the read-write storage element belongs to the third set; and the second part of the dump operation further moves a given read-write storage element which is in the third state into the fourth state when the contents of the given read-write storage element are copied to the write once/read many storage element corresponding to the given read-write storage element.

16. The file system set forth in claim 12 wherein:

certain contents of the first sets are additionally stored in read-write storage elements;

the file system further comprises means for indicating the read-write storage elements in which the certain contents are stored; and the first part of the dump operation further includes the step of indicating the marked elements in the means for indicating.

17. The file system set forth in claim 13 or claim 16 wherein:

the first part of the dump operation is atomic and the writing of the marked elements is interspersed with the performance of other file operations.

18. The file system of any of claims 4, 5, 6, 7, or 11 wherein:

the file system further comprises additional read-write storage elements, each one of the additional read-write storage elements corresponding to a read only storage element containing old contents and storing a copy of the corresponding read only element's old contents.

19. The file system of any of claims 4, 5, 6, 7, or 11 wherein:

the file system further comprises a first storage device which is repeatedly readable and writable and permits random access and a second storage device which is writable once and repeatedly readable; and the read-write storage elements are stored on the first storage device and the write once/read many storage elements are stored on the second storage device.

20. A file system for use in a computer system having read-write and write once/read many storage elements for storing file contents, the file system comprising:

at least one primary file whose contents include old contents which are stored in written ones of the write once/read many storage elements and new contents which are stored in the read-write elements and means for performing file operations, the file operations including at least a write operation and a separate dump operation, the write operation operating to write the new contents to the read-write storage elements and the dump operation operating to write the new contents to unwritten ones of the write once/read many storage elements and the new contents being written to the unwritten ones of the write once/read many storage elements only by the dump operation.

21. The file system set forth in claim 20 wherein:

the dump operation further operates to reestablish the primary file such that the reestablished primary file contains only old contents including the new contents being written to unwritten ones of the once-write/read many storage elements by the dump operation.

22. The file system set forth in claim 20 wherein:

all contents of the primary file which have not been altered since the last dump operation are old contents and all contents of the primary file which have been added or altered since the last dump operation are new contents.

23. The file system set forth in claim 22 wherein:

the file operations further include read operations which read the contents of a file;

the dump operation further operates to create a secondary file which conserves the state of the primary file at the time of the dump operation and whose contents are stored in the write once/read many storage elements written by the dump operation and in the write once/read many storage elements which contained the old contents at the time the dump operation is performed; and the read operations only may be performed on the secondary file using an interface which is the same as that used for read operations on the primary file.

24. The file system set forth in claim 20 wherein:

a correspondence between the read-write elements in which new contents are stored and unwritten write once-read many elements exists at the time the new contents are stored; and.

the dump operation operates to write the new contents of a given read-write element to its corresponding unwritten write once-read many element.

25. The file system set forth in claim 24 wherein:

the dump operation comprises a first part in which the read-write elements in which new contents are stored are marked as having been dumped; and a second part in which the marked read-write elements are written to their corresponding unwritten write once-read many elements.

26. The file system set forth in claim 25 wherein:

the first part of the dump operation further includes reestablishing the primary file such that the old contents of the primary file after the dump operation include the marked elements.

27. The file system set forth in claim 25 or claim 26 wherein:

the first part of the dump operation is atomic;

the writing of the marked elements is interspersed with the performance of other file operations; and for purposes of file operations which add or alter the contents or the dump operation, the marked elements which have not yet been written contain old contents.

28. A file system for use in a computer system having read-write and write once/read many storage elements for storing file contents, the file system comprising:

at least one file whose contents includes old contents which are stored in written ones of the write once/read many storage elements and new contents which are stored in the read-write elements and means for performing file operations, the file operations including at least a first operation which adds new contents to the file, a second operation which deletes new contents from the file, and a third operation which writes the new contents to unwritten ones of the write once/read many storage elements; and the means for performing file operations operates in the course of the first operation to establish a correspondence between a read-write element required for new contents with an unwritten write once/read many storage element, operates in the course of the second operation to disestablish the correspondence between a read-write element whose new contents have been deleted and its corresponding unwritten write once/read many storage element, and operates in the course of the third operation to write the new contents stored in a read-write element to the corresponding unwritten write once/read many storage element.

29. The file system set forth in claim 28 wherein:

the file operations further includes a fourth operation which reads old and/or new contents of the file; and in the course of a fourth operation which reads old contents of the file, the means for performing file operations establishes a correspondence between a read-write element and the written write once/read many storage element in which the old contents are stored and copies the old contents into the corresponding read-write element.

30. A method for dumping a primary file which is stored in a file system having read-write and write once/read many storage elements for storing file contents, the file's contents including old contents which are stored in written ones of the write once/read many storage elements and new contents which are stored in the read-write elements, the method comprising the steps of:

as part of the operation of storing new contents in a given read-write storage element, establishing a correspondence between the given read-write storage element and a given unwritten write once/read many storage element; and in response to a dump command, and at no other time, copying the contents of the read-write storage elements to the corresponding unwritten write once/read many storage elements.

31. The method set forth in claim 30 wherein:

the step of copying the new contents to the corresponding unwritten write once/read many storage elements includes the steps of atomically marking all of the read-write storage elements which contain the new contents; and nonatomically copying the contents of the marked read-write storage elements to their corresponding unwritten write once/read many storage elements.

32. The method set forth in claim 30 and further comprising the step of:

creating a secondary file which conserves the state of the primary file at the time of the dump command and whose contents are stored in the write once/read many storage elements written in response to the dump command and in the write once/read many storage elements containing the old contents at the time of the dump command.

33. The method set forth in claim 32 wherein:

certain old contents of the primary file are additionally stored in the read-write storage elements;

the step of creating the secondary file further includes the step of further atomically marking all of the read-write storage elements which contain the new contents to indicate that the read-write storage elements contain old contents.

34. A method for altering a file which is stored in a file system having read-write and write once/read many storage elements for storing file contents, the file's contents including new contents, which are stored in the read-write elements, and old contents which are stored in written ones of the write once/read many storage elements, the method comprising the steps of:

when the file is altered by adding new contents, establishing a correspondence between the read-write storage elements containing the new contents and unwritten write once/read many storage elements;

when the file is altered by removing new contents, disestablishing the correspondence between the read-write storage elements containing the removed new contents and the corresponding unwritten write once/read many storage elements; and at intervals, copying the contents of the read-write storage elements having corresponding unwritten write once/read many storage elements to their corresponding unwritten write once/read many storage elements, whereby the new contents become old contents.

* * * * *